(12) United States Patent
Richey

(10) Patent No.: US 11,270,115 B2
(45) Date of Patent: Mar. 8, 2022

(54) PRESENTATION OF AUGMENTED REALITY CONTENT BASED ON IDENTIFICATION OF TRIGGER ACCOMPANYING VIDEO CONTENT

(71) Applicant: Lenovo (Singapore) Pte. Ltd., Singapore (SG)

(72) Inventor: Allen Wayne Richey, Frisco, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/687,245

(22) Filed: Nov. 18, 2019

(65) Prior Publication Data
US 2021/0150212 A1  May 20, 2021

(51) Int. Cl.
*G06K 9/00* (2006.01)
*H04L 29/06* (2006.01)
*G09G 3/00* (2006.01)
*H04L 67/131* (2022.01)

(52) U.S. Cl.
CPC ...... *G06K 9/00671* (2013.01); *G06K 9/00711* (2013.01); *G09G 3/001* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 2012/0127284 A1* | 5/2012 | Bar-Zeev | .............. | G06T 19/006 348/53 |
| 2016/0315928 A1* | 10/2016 | Yu | ........................... | G06F 1/163 |
| 2016/0328681 A1* | 11/2016 | Portnoy | ................. | G06Q 50/01 |
| 2017/0118374 A1* | 4/2017 | Tsujiguchi | .............. | G06F 21/84 |
| 2017/0201808 A1* | 7/2017 | Chowdhary | ....... | H04N 21/8358 |
| 2017/0330036 A1* | 11/2017 | Plowman | ........... | G06K 9/00744 |
| 2017/0330449 A1* | 11/2017 | Lunardhi | ............... | G08B 29/18 |
| 2018/0035234 A1* | 2/2018 | Roach | ..................... | H04S 7/303 |
| 2018/0224929 A1* | 8/2018 | Mullen | ................... | G06F 1/163 |
| 2018/0322706 A1* | 11/2018 | Drouin | ................. | G06T 19/006 |
| 2020/0221112 A1* | 7/2020 | Braudaway | ........... | G06T 1/0085 |
| 2020/0244725 A1* | 7/2020 | Yamagishi | .......... | H04L 67/1004 |

* cited by examiner

*Primary Examiner* — Jennifer Mehmood
*Assistant Examiner* — Jed-Justin Imperial
(74) *Attorney, Agent, or Firm* — John M. Rogitz; John L. Rogitz

(57) ABSTRACT

In one aspect, a headset may include at least one processor, at least one transparent display accessible to the at least one processor, and storage accessible to the at least one processor. The storage may include instructions executable by the at least one processor to detect an indication accompanying audio video (AV) content, with the indication associated with augmented reality (AR) content. The AR content may be different from the AV content but associated with the AV content. The instructions may also be executable to transmit a request for the AR content, receive the AR content, and present the AR content on the at least one transparent display.

20 Claims, 8 Drawing Sheets

PRESENTATION OF AUGMENTED REALITY CONTENT BASED ON IDENTIFICATION OF TRIGGER ACCOMPANYING VIDEO CONTENT

FIELD

The present application relates to technically inventive, non-routine solutions that are necessarily rooted in computer technology and that produce concrete technical improvements.

BACKGROUND

Presentation of video content on televisions, computers, smartphones etc. provides entertainment opportunities for users of those electronic devices. However, as recognized herein, those devices are technologically limited in the types and amount of content they can present. Additionally, content providers may sometimes wish to enhance the experience of consuming video content, which is also technologically limited by the content presentation device itself and often provides no personalization for individual users. There are currently no adequate solutions to the foregoing computer-related, technological problem.

SUMMARY

Accordingly, in one aspect a headset includes at least one processor, at least one transparent display accessible to the at least one processor, and storage accessible to the at least one processor. The storage includes instructions executable by the at least one processor to detect an indication accompanying audio video (AV) content, with the indication being associated with augmented reality (AR) content. The AR content is different from the AV content but associated with the AV content. The instructions are also executable to transmit a request for the AR content, receive the AR content, and present the AR content on the at least one transparent display.

In some examples, the indication may be detected in a signal transmitted by a device different from the headset that is presenting the AV content. Additionally or alternatively, the indication may be detected in audio of the AV content, video of the AV content, and/or metadata accompanying the AV content. The indication may include a unique identifier for the AR content, and the unique identifier may be transmitted in the request for the AR content.

Additionally, in some examples the instructions may be executable to present the AR content on the at least one transparent display concurrently with presentation of at least a portion of the AV content on a device different from the headset.

The AR content may include stereoscopic images and/or a virtual button that is selectable by a user.

Still further, in some implementations the instructions may be executable to identify a location within the received AR content into which user-specific data is insertable, identify first user-specific data to insert into the location, insert the first user-specific data into the location, and then present the AR content with the first user-specific data on the at least one transparent display.

In another aspect, a method includes detecting a trigger accompanying video content that is presented on an electronic display of a device, with the trigger being associated with virtual content. The virtual content is different from the video content but associated with the video content. The method also includes transmitting a request for the virtual content responsive to detecting the trigger, receiving the virtual content, and presenting the virtual content on a transparent display of a headset. The virtual content is presented concurrently with at least a portion of the video content, and the headset is different from the device.

The virtual content may include virtual reality content and/or augmented reality content. Also, in certain implementations the trigger may indicate an identification number for the virtual content, and the identification number may be transmitted in the request.

The trigger may be detected via metadata accompanying the video content. Additionally or alternatively, the trigger may be detected via a wireless signal transmitted by the device.

The video content itself may include a television broadcast. The video content may also include streamed content and/or digital media.

In another aspect, a first device includes at least one computer readable storage medium (CRSM) that is not a transitory signal. The CRSM includes instructions executable by at least one processor to receive, from a headset, a request for augmented reality (AR) content associated with video content. The video content is different from the AR content and the headset is different from the first device. The request itself includes an identification number for the AR content. The instructions are also executable to, responsive to receipt of the request, transmit the AR content to the headset along with timing information indicating when, during presentation of the video content on a second device different from the headset and different from the first device, the AR content should be presented using the headset. The first device may be embodied in a server.

The details of present principles, both as to their structure and operation, can best be understood in reference to the accompanying drawings, in which like reference numerals refer to like parts, and in which:

DETAILED DESCRIPTION

Figure 1:
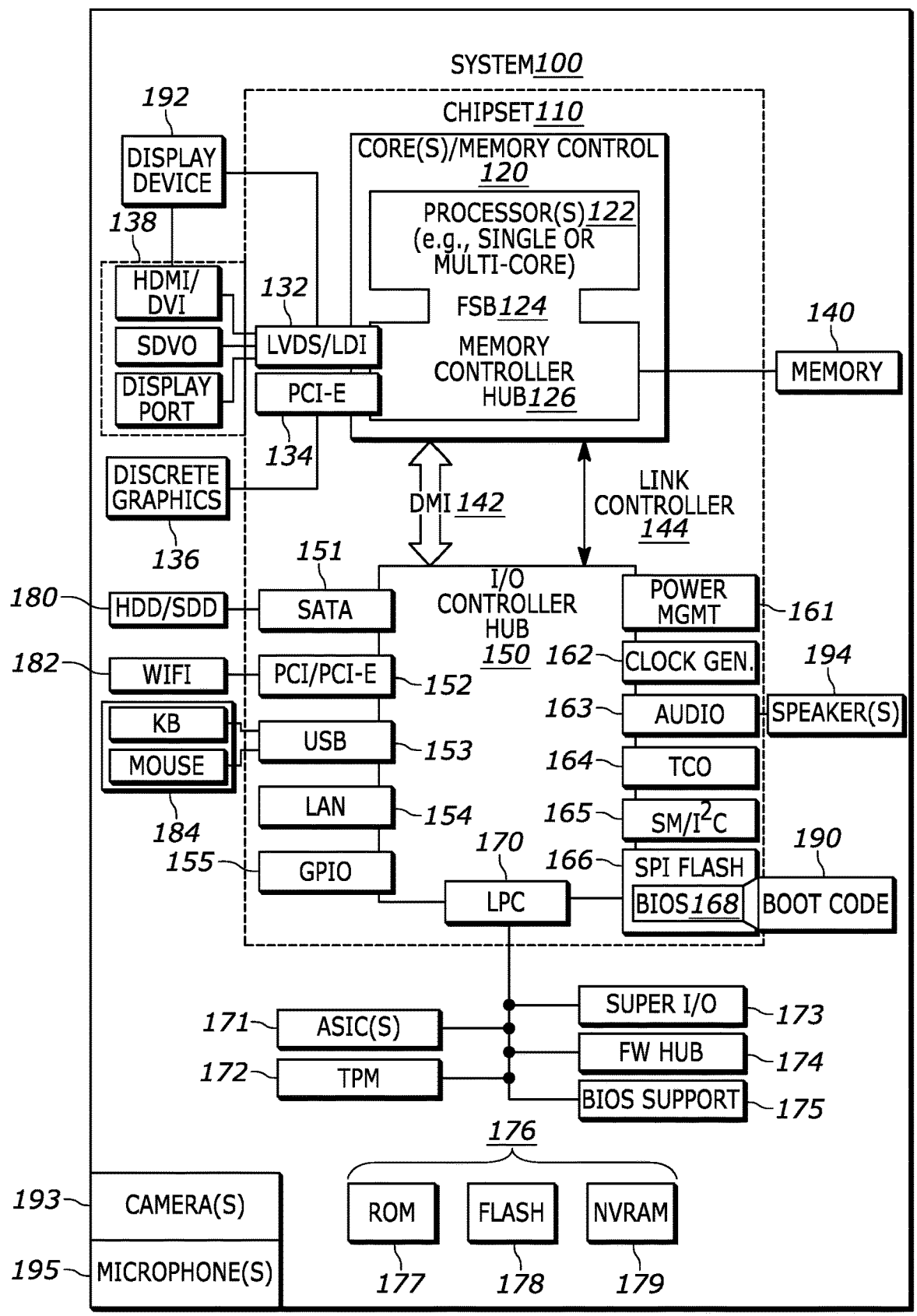
FIG. 1 is a block diagram of an example system consistent with present principles.

Among other things, the present application discloses systems and methods to sync up augmented reality (AR) content with media services such as television broadcasts or streaming services such as Netflix, Hulu, Amazon Prime, etc., and to deliver a focused and targeted mixed media experience. The AR content may be defined/provided by an AR content delivery network or other content provider.

To accomplish this, an AR event may be triggered through the actual media delivery of the base audio video (AV) content itself, whether that be a television broadcast, video game (streaming or offline), digital media streamed over the Internet, AV content presented from physical media such as a DVD, Blu-ray, or compact disc, etc. The trigger itself may be detected by a user's AR headset and the headset may then send across a call or pull request which pulls AR content from an AR content delivery-type of network (though in other embodiments the television or content provider may simply push the AR content to the headset). Thus, advertisers, directors, entertainment companies, etc. can leverage the content delivery network to trigger AR events for users, which can enhance the users' media experience with well-timed and relevant AR content.

As an example, a user might be watching a film or movie presented on a television and a subtle AR event may be triggered to further immerse the user into the experience. E.g., AR may be used to extend the viewing area of the television and generate relevant AR content like water continuing a flow off the screen or smoke drifting off to the side of the TV.

As another example, a user might be watching a pizza commercial presented on a television and the producer of that content may insert a trigger into the commercial that calls on some specific AR event sitting on the content delivery network. The content might show pizza places nearby the user locally and even allow user interaction to initiate an order.

As still another example, a user might be watching an educational video presented on a television, and the video might include triggers throughout to show respective AR events relating to the video. This could include some additional facts about a specific animal being shown on the screen and even fun interactive content for kids that is relevant to the video.

As but one more example, during presentation of a national park documentary being presented on a television, there might be AR scenes generated using the user's headset that show supplemental information relating to the scene and even a button to order tickets or get additional information.

Prior to delving further into the details of the instant techniques, with respect to any computer systems discussed herein, it is to be understood that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may further include an audio receiver/microphone 195 that provides input from the microphone 195 to the processor 122 based on audio that is detected, such as audio of audio video (AV) content that is being presented consistent with present principles. Still further, the system 100 may include a camera 193 that gathers one or more images and provides input related thereto to the processor 122. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video, such as images of video of AV content that is being presented consistent with present principles.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
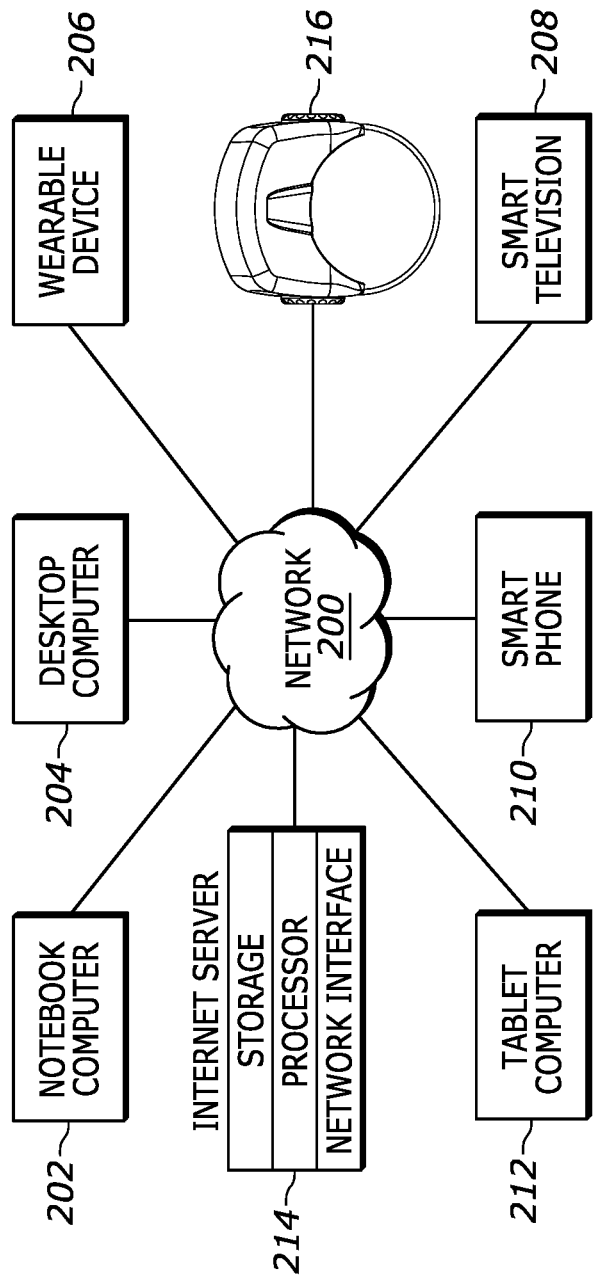
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 are configured to communicate with each other over the network 200 to undertake present principles.

Figure 3:
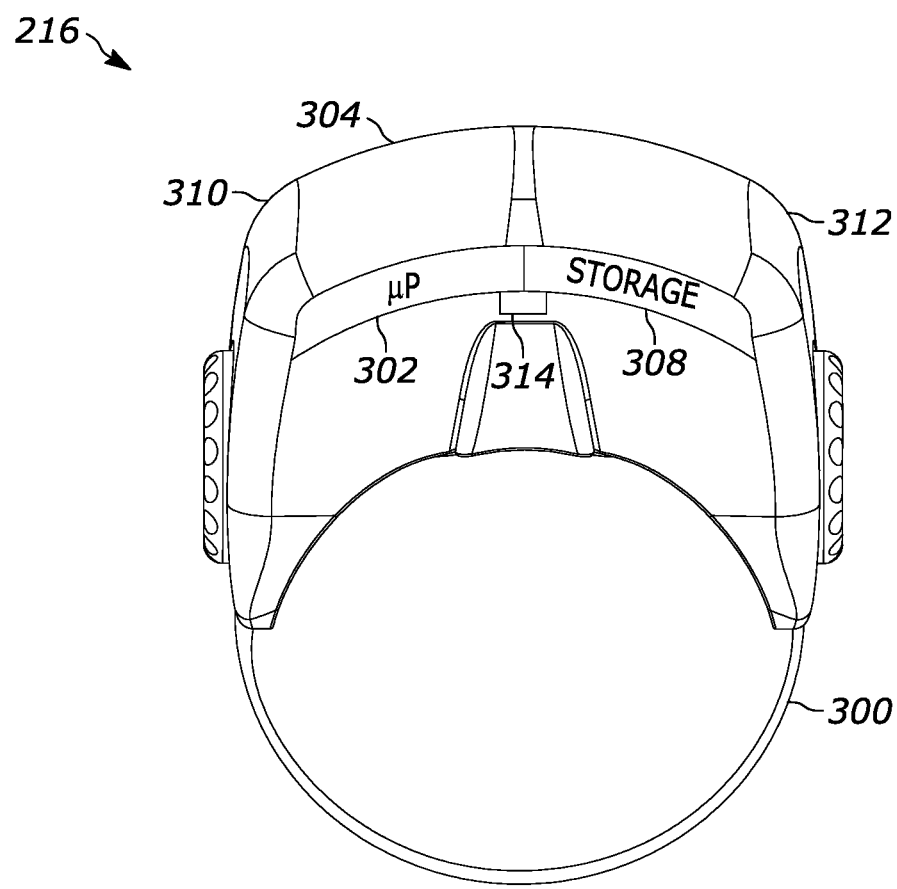
FIG. 3 shows a top plan view of an augmented reality (AR) headset that may be used consistent with present principles.

Now describing FIG. 3, it shows a top plan view of a headset, such as the headset 216, consistent with present principles. The headset 216 may include a housing 300, at least one processor 302 in the housing, and a transparent "heads up" display 304 accessible to the at least one processor and coupled to the housing. Additionally, the headset 316 may include storage 308 accessible to the processor 302 and coupled to the housing 300, as well as one or more cameras 310, 312 accessible to the processor 302 and coupled to the housing 300 for use as disclosed herein. Thus, the cameras 310, 312 may be oriented to face away from the headset 216 in the front-facing direction in which a user's head would be oriented when wearing the headset 216. The headset 216 may also include one or more cameras 314 oriented inward to image the user's eyes while the user wears the headset 216 for eye tracking consistent with present principles.

Still further, note that the headset 216 may include still other components not shown for simplicity, such as a network interface for wirelessly communicating over a network such as the Internet and a battery for powering components of the headset 216. Additionally, note that while the headset 216 is illustrated as an augmented reality (AR) headset (e.g., electronic glasses), the headset 216 may also be established by another type headset such as a virtual reality (VR) headset that may not have a transparent display but may still be able to present electronic content such as AR content and/or stereoscopic images along with a real-world, real-time camera feed of an environment imaged by one or more of the cameras 310, 312 to provide an AR experience to the user consistent with present principles. Also note that electronic contact lenses with their own respective heads up displays may also be used consistent with present principles.

Figure 4:
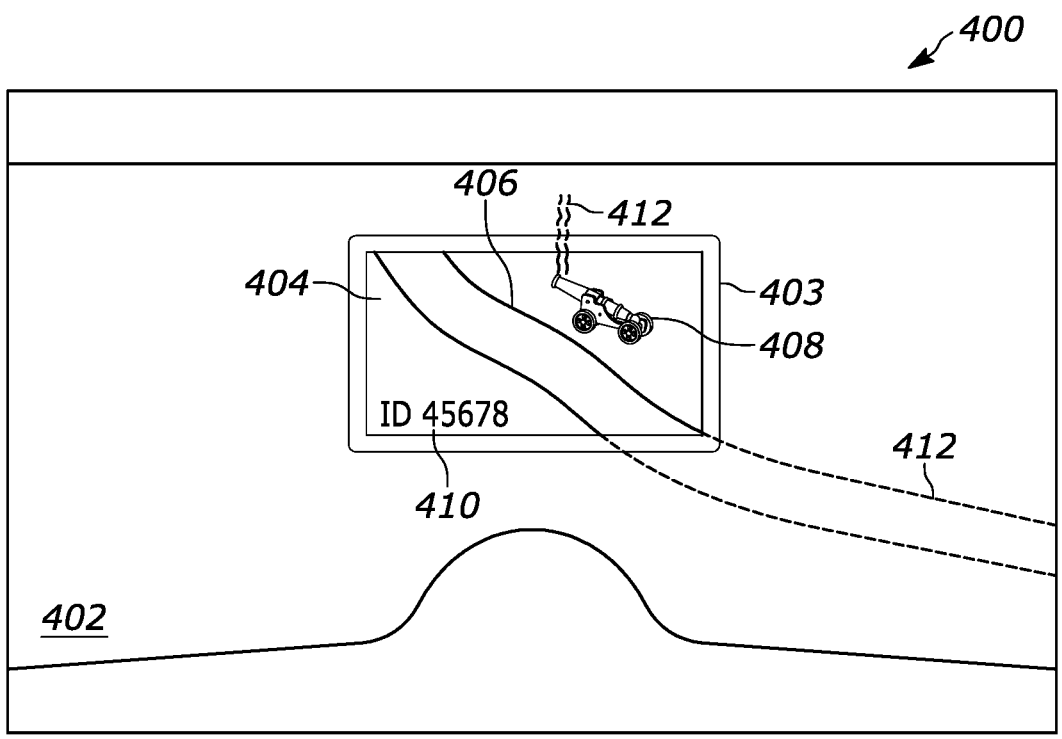
FIGS. 4-6 show the perspective of a user of the AR headset while viewing the real world through the headset's transparent display consistent with present principles.

Now describing FIG. 4, it shows a perspective 400 of a user while wearing a headset having a transparent display 402 through which the real world may be viewed. In this example, the user of the headset is viewing a television (TV) 403 that is separate from the headset itself and mounted on a wall within the user's environment. Audio video (AV) content 404 is being presented on the TV 403. It is to be understood that in this example the AV content 404 pertains to a Revolutionary War film, and as such a river 406 and cannon 408 are shown.

As also shown in FIG. 4, at least one frame (and possibly only one frame) of the video portion of the AV content 404 may include an indication in the form of a unique content identifier/identification number (ID) 410 associated with the particular scene or segment of the AV content 404 that is currently being presented. The content ID 410 may be presented on only one frame, or in a few different frames that are each separated by a threshold number of other frames, so as to not be perceptible to the user given a relatively fast frame/refresh rate of, e.g., 240 Hz but still detectable by the headset using its camera(s).

Then, based on identifying the content ID 410 using one or more images from its camera and text recognition or optical character recognition, the headset may transmit a request to a remotely-located server or content delivery network for AR content associated with the scene or segment (or, in some circumstances, associated with the AV content 404 as a whole). The request may be transmitted over the Internet using the headset's wireless network transceiver. Additionally or alternatively, the request may be transmitted through the content delivery network used to access the AV content 404 itself. The request may also be transmitted using local communication between the TV 403 and headset along with a bi-directional Advanced Television Systems Committee (ATSC) communications link between the TV 403 and device(s) through which the AV content 404 might be delivered.

Then, in response to the request, the headset may receive back AR content 412 associated with the content ID 410 (e.g., stereoscopic images of virtual content such as selectable buttons and other graphical elements). The AR content 412 may be received using the same communication link or medium as used to send the request (e.g., the Internet or a bi-directional ATSC communication link), though the AR content 412 may also be received using a different communication link or medium.

As may be appreciated from FIG. 4, the AR content 412 is complimentary to the video portion of the AV content 404 itself in that is "extends" the same images shown in the video portion off of the TV 403 so that the river 406 and smoke from the cannon 408 appear to the user while wearing the headset to actually extend offscreen from the TV 403. The AR content 412 may even be animated in that waterflow of the river 406 may continue from the TV 403 off its screen. This may be accomplished using timing information that might be received by the headset along with the AR content 412 itself, where the timing information may indicate respective playback times (e.g., minute 35, second 2) or frames within the AV content 404 during which respective portions or frames of the AR content 412 are to be concurrently presented. The headset may then use its camera and/or microphone to identify various portions of the AV content 404 that are currently being presented to thus sync the AR content 412 based on the timing information, and/or the headset may receive a stream of metadata from the TV 403 indicating a currently-presented portion of the AV content 404 for synchronization using the timing information. This may provide a unitary look to the AV content 404 in that the AR content 412 may act to establish additional portions of the video frames of the AV content 404.

Figure 5:
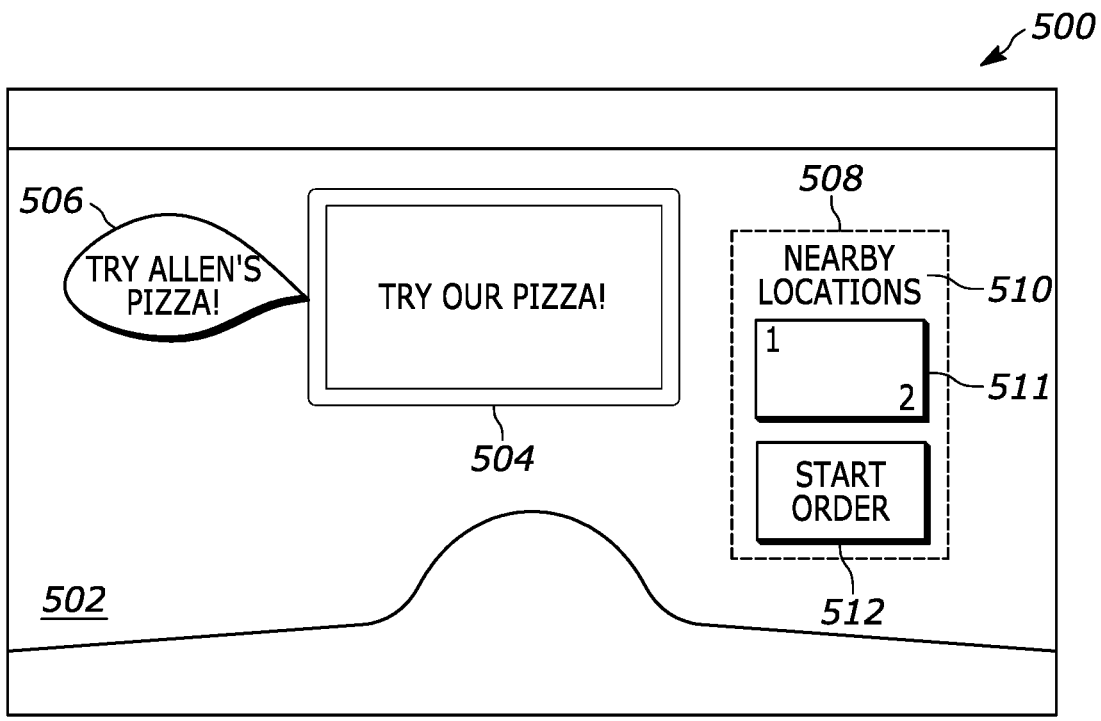

Another example is shown in FIG. 5. FIG. 5 again depicts a perspective 500 of a user while wearing a headset having a transparent display 502 through which the real world may be viewed. In this example, the user of the headset is again viewing a television (TV) 504 that is separate from the headset itself and mounted on a wall within the user's environment. Audio video (AV) content 506 is being presented on the TV 504, this time in the form of an AV commercial for a pizza restaurant.

As part of the AV content 506, speakers on the TV 504 output audio indicating "Try Allen's pizza!" Based on the headset detecting that audio indication via its microphone, the headset may execute speech to text software to convert the audio to text and then check the text against entries in a relational database to which the headset has access to determine whether the phrase from the audio is indicated in the database as being a trigger for presentation of associated AR content. The relational database may be stored remotely or locally at the headset, but in either case may indicate an AR content ID associated with that particular phrase. Once identified from the database, the headset may then use the AR content ID by including it in a request for the associated AR content consistent with present principles.

Alternatively, note that the server may do the speech to text translation itself, and/or the text generated by headset's the speech to text translation may be transmitted to a remotely-located server which may itself lookup an associated AR content ID associated with the text and then simply transmit the associated AR content back to the headset.

Also note that in some examples, the audio itself of "Try Allen's pizza!" may streamed to a remotely-located server from the headset, with the audio being used by the server to identify the AR content ID once the audio has been matched to prestored audio for which the AR content ID is associated. The AR content ID may then be sent back to the headset or simply used to determine the associated AR content itself that is to be transmitted back to the headset from the server.

Regardless, once the AR content itself has been received by the headset through push or pull, it may be presented using the headset's display. In this example, a graphical user interface (GUI) 508 may be presented as part of the AR content using stereoscopy and/or augmented reality software. The GUI 508 may be presented off to the side of the TV 504 in the X-Y plane and may also be presented to appear as though located at the same real-world depth as the TV 504 relative to the headset (e.g., a certain location on the wall adjacent to the TV 504). This may be accomplished based on the headset executing computer vision algorithms, image registration, simultaneous localization and mapping (SLAM), etc. to track the position of the headset with respect to the TV 504 so that the headset may continue to present the GUI 508 as though anchored at the same real-world location regardless of movement of the user and therefore headset.

As shown in FIG. 5, the GUI 508 may include text 510 and a map 511 indicating nearby locations of Allen's Pizza restaurant. The GUI 508 may even include a virtual button 512 that may be selectable by the user to initiate a pizza order from one of the locations. To initiate the order, in some examples the user may first select one of the locations from the map 511 using voice input, staring at the location for a threshold amount of time (e.g., two seconds) as determined using eye tracking, or "air tapping" on the respective location. The user may then select the button 512 using one of those same methods to initiate a pizza order from that location.

Selection of the button 512 may then cause the pizza order to be initiated by causing the headset or another device in communication with the headset (e.g., the user's smart phone) to initiate a telephone call to the selected location/ restaurant for the user to place the pizza order over the phone. Additionally or alternatively, selection of the button 512 may cause the headset to present another GUI on its display (or the display of the user's smart phone), where that GUI may include various options that are selectable by the user to submit the pizza order electronically using an Internet connection based on interaction with that GUI.

Describing the aforementioned air tap in more detail, note that an air tap may be used consistent with present principles to select any button or other graphical element disclosed herein as presented on the headset's display. The air tap itself may be a gesture where the user attempts to touch the button or other element where it appears to be located in the real world (e.g., floating in front of the user, disposed on the wall, etc.). The headset's outward-facing camera(s) may track this gesture and the headset may then execute gesture recognition and/or computer vision to determine that the user is attempting to "tap" that real-world location with the end of his or her finger in order to select the virtual button or other element.

Figure 6:
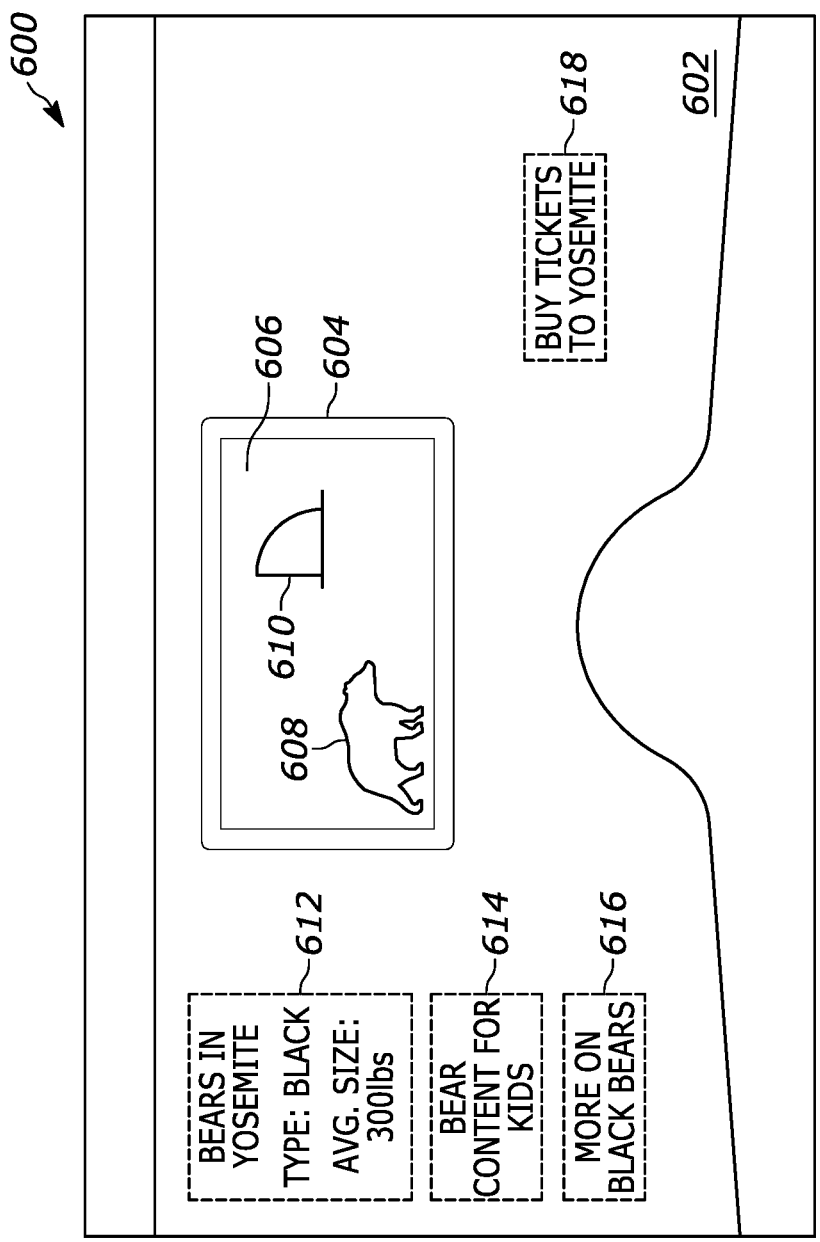

Now in reference to FIG. 6, yet another example consistent with present principles is shown. In FIG. 6, a perspective 600 of a user is shown while the user wears a headset having a transparent display 602 through which the real world may be viewed. In this example, the user of the headset is once again viewing a TV 604 that is separate from the headset itself and mounted on a wall within the user's environment. Audio video (AV) content 606 is being presented on the TV 604, this time in the form of a documentary on Yosemite National Park. As shown, a video portion of the AV content 606 is showing a bear 608 in the foreground and Half Dome 610 in the background relative to the bear 608.

In this example, metadata created by the provider of the AV content 606 and provided to the TV 604 may then be wirelessly relayed by the TV 604 to the headset. The metadata may indicate an AR content ID associated with the particular scene or segment of the AV content 606 showing the bear 608 and Half Dome 610. Additionally or alternatively, a wireless signal may be transmitted from the TV 604 to the headset that indicates the AR content ID, where the AR content ID may have been initially received by the TV 604 separately from the AV content 606 and/or its metadata.

For example, when the TV 604 initially accesses the AV content 606, it may also access a data table correlating various playback times within the AV content 606 with respective AR content IDs for respective AR contents that may be presented during those respective playback times. Then at an appropriate time the TV 604 may transmit a certain AR content ID to the headset that is associated with a given segment of the AV content 606 that is or will be presented. E.g., the AR content ID may be transmitted a threshold time (e.g., three seconds) before the corresponding segment of the AV content 606 is actually presented at the TV 604 so that the headset has time to communicate with a remotely-located server to fetch the associated AR content for presentation at the designated playback time.

In the example shown, the AR content includes a GUI 612 that lists supplemental facts about black bears beyond those provided in the AV content 606 itself, such as their average weight. The AR content may also include a button 614 that may be selectable via voice command, air tap, or staring for a threshold time in order to cause the headset to access and present interactive content related to black bears that is tailored to children. For example, selection of the button 614 may cause a children's video on black bears to be presented or to cause an electronic game related to black bears to be presented.

The AR content may also include a button 616 that may be selectable to cause the headset to access and present additional facts on black bears. For example, selection of the button 616 may cause a Wikipedia web page on black bears to be presented. Even further, in some examples the AR content may include a button or link 618 that may be selectable to cause the headset to navigate to a website or portal through which tickets to Yosemite National Park may be purchased and additional information about Yosemite National Park may be viewed.

Also, note that each of the GUI 612 and buttons 614-618 may be presented using the AR headset to appear as though floating in front of the user at a depth in between the user and the wall on which the TV 604 is mounted, though in some examples any of those AR contents may instead be presented to appear as though disposed on the same wall as the TV 604 itself but off to the side of the TV 604.

Figure 7:
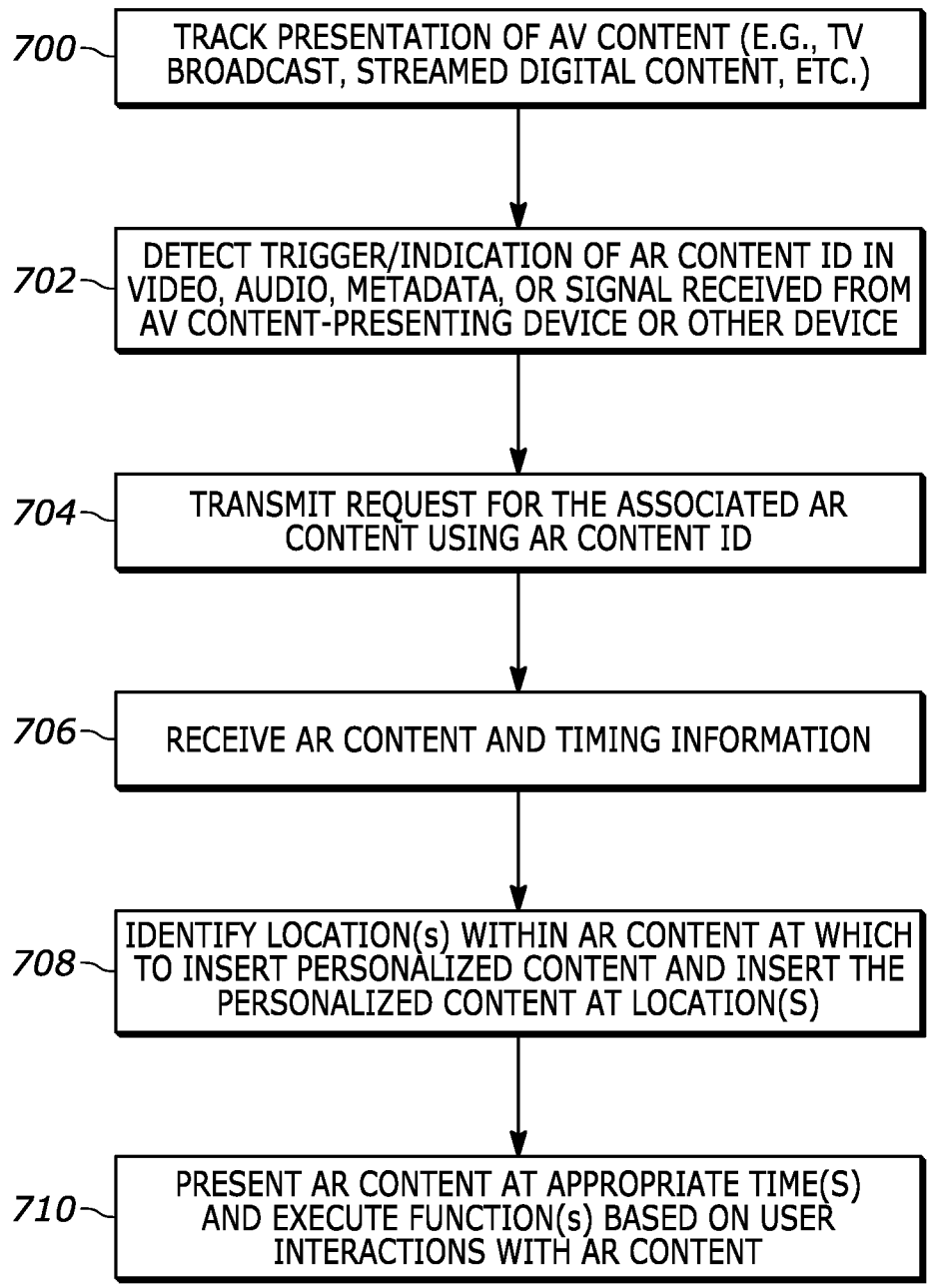
FIGS. 7 and 8 are flow charts of example algorithms executable by a device consistent with present principles.

Referring now to FIG. 7, it shows example logic that may be executed by a device such as the system 100 and/or a user's AR or VR headset for undertaking present principles. While all of the logic of FIG. 7 may be executable by the headset, in some examples certain portions of the logic may also be executed by stand-alone digital assistant device or smart hub (such as Lenovo's ThinkSmart Hub) that communicates with the headset.

In any case, beginning at block 700 the headset may track presentation of AV content on another device, such as one of the TVs described above or a laptop computer, smart phone, tablet computer, etc. The AV content may be a television show broadcasted over terrestrial airwaves, satellite communication, fiberoptic cable delivery, etc. The AV content may also be digital media content streamed over the Internet, such as a Netflix movie, YouTube video, etc. The headset may track presentation of the AV content using its camera and/or microphone to then detect a trigger or indication of an AR content ID at block 702.

For example, the trigger may be detected in a video portion of the AV content as identified using images from the headset's outward-facing camera(s) showing the video portion as presented at the other device. The trigger may also be detected in an audio portion of the AV content as identified using input from the headset's microphone(s) indicating the audio portion as presented at the other device. Metadata, quick packages, and other signals received at the headset from the device presenting the AV content (or even an Internet server that is streaming the AV content to that device) may also include the trigger or indication with the AR content ID.

Then at block 704 the headset may transmit a request for AR content associated with the AR content ID for the particular portion of the AV content that is (or will be) presented at the other device. The request may specify the AR content ID that was detected or identified at block 702. The request may be routed through the other device presenting the AV content to a remotely-located server storing the AR content itself, though it may also be sent to the server by the headset itself without being routed through the other device presenting the AV content. Thereafter, at block 706 the headset may receive back from the server the corresponding AR content along with associated timing information indicating when that AR content should be presented during playback of the AV content itself.

From block 706 the logic may then proceed to block 708. At block 708 the headset may identify locations within the AR content itself at which to insert personalized content for a given user. Also at block 708, the headset may insert the personalized content into the appropriate locations of the AR content itself for presentation to the user according to the timing information for the AR content. The personalized content may indicate, for example, a name of the user of the headset as specified by the user and stored at the headset based on the user initially setting up the headset and connecting it to the Internet. Thus, using the example from FIG. 5 above and assuming the user's name is John, the GUI 508 might not simply indicate the text 510 but the text 510 may be preceded by a salutation such as "Hey John, here's" so that the text 510 actually reads "Hey John, here's nearby locations". Other types of personalized content may also be presented based on age, height, gender, habits, interests, social media information, or other identifying characteristics of the particular user of the headset.

From block 708 the logic may then proceed to block 710. At block 710 the headset may present the AR content at the headset according to the timing information. The AR content presented at block 710 may include, for example, both visual AR content and even binaural audio that complements the AV content's audio and that mimics sounds as coming from different directions to correspond to various aspects of the AR content itself.

To present the AR content at the appropriate playback time(s) during presentation of the AV content based on the timing information, the headset may use its camera and/or microphone to recognize various portions of the AV content that are presented at different times. Additionally or alternatively, the headset may use information (e.g., metadata) received from the other device that indicates what portion of the AV content is currently being presented or will be presented.

Also at block 710, note that the headset may execute one or more functions based on user interactions with the AR content, such as the user selecting one of the buttons described above in reference to FIGS. 5 and 6 to then take appropriate action based on that selection (e.g., presenting more information on black bears, initiating a pizza order, etc.).

Figure 8:
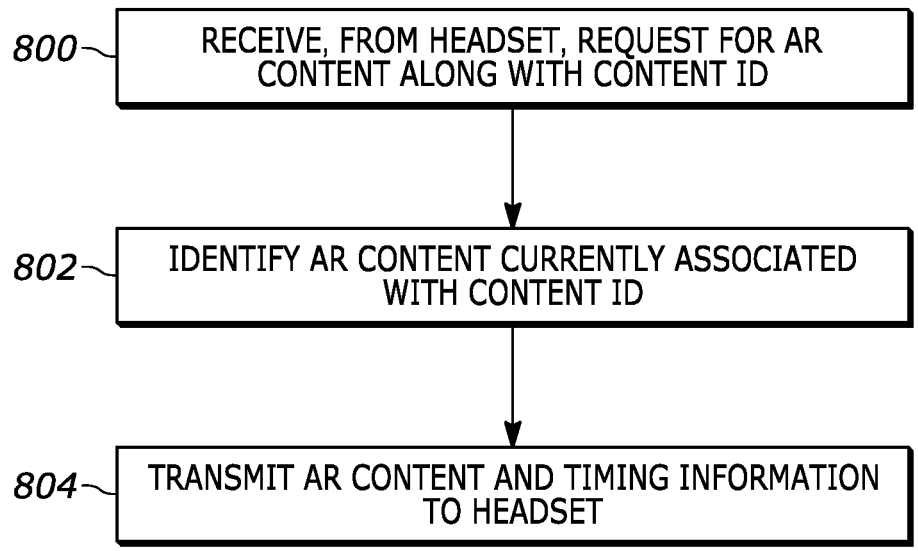

Continuing the detailed description in reference to FIG. 8, it shows example logic that may be executed by a server or other device (e.g., content delivery network computer) to provide AR content to a headset consistent with present principles. Beginning at block 800, the server may receive a request for AR content from a headset along with an AR content ID specifying the AR content being requested. The logic may then move to block 802.

At block 802 the server may identify certain AR content and associated timing information as stored at the server (or elsewhere) that is currently associated with the AR content ID specified by the headset. For example, the server may store AR contents and timing information by AR content ID, and therefore the server may simply lookup the AR content ID itself to access the associated AR content and timing information. A relational database correlating AR content IDs to respective AR content storage locations may also be used to identify the appropriate AR content and timing information by storage location. Also, note that the timing information itself may have been initially specified by the AR content's developer, the AV content's developer, a third party, etc.

As for the AR content itself, the present patent application recognizes that over time the AR content's provider and/or a provider of the AV content may wish to change or replace certain AR content associated with a given portion of AV content with other, new AR content. Thus, the same AR content ID may be used so that, for example, the underlying AV content itself does not need to be changed if it indicates the AR content ID in video, audio, metadata, or a separate signal, but the AR content itself can still be updated or replaced at the server and associated with the same AR content ID. This aspect will be described further below in reference to FIG. 10.

Still in reference to FIG. 8, however, note that from block 802 the logic may next proceed to block 804. At block 804 the server may transmit the AR content currently corresponding to the received AR content ID to the headset along with the timing information.

Figure 9:
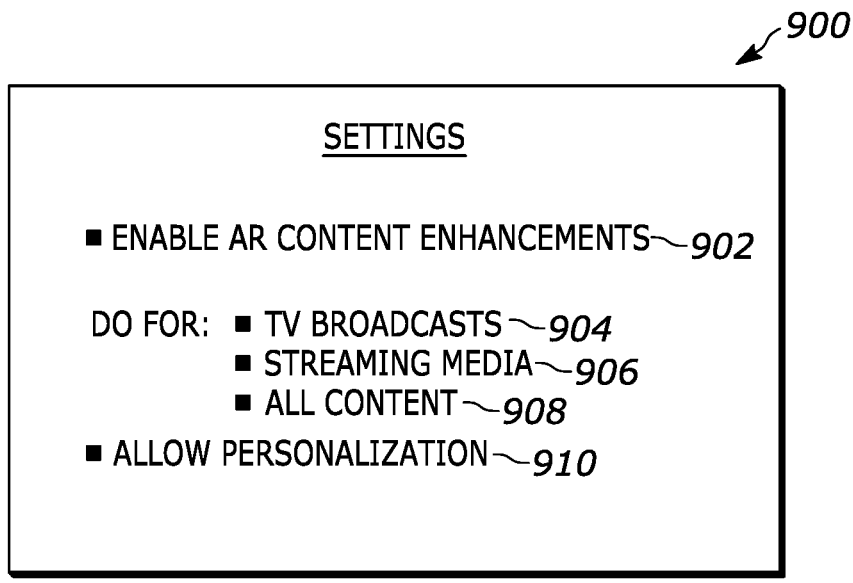
FIGS. 9 and 10 show example graphical user interfaces (GUIs) for configuring one or more settings of a device that operates consistent with present principles.

Now describing FIG. 9, it shows an example graphical user interface (GUI) 900 that may be presented on the display of a headset or another end-user device to configure one or more settings of the headset related to presentation of AR content consistent with present principles. For example, in addition to or in lieu of being presented on the headset's display, the GUI 900 may also be presented on the electronic display of the user's smart phone, which might be in communication with the headset to configure its settings. In any case, each of the options that will be described below with respect to FIG. 9 may be selected by selecting the corresponding check box that is shown adjacent to the respective option. The check box may be selected via cursor input, touching the check box, air tapping the check box, voice command selecting the check box, etc.

As shown in FIG. 9, the GUI 900 may include a first option 902 that may be selectable to configure the headset to undertake present principles. For example, the option 902 may be selected to enable or set the headset to identify AR content triggers and present AR contents as described, to execute the logic of FIG. 7, etc.

The GUI 900 may also include options 904-908 to present AR contents specifically for TV broadcasts alone (option 904), AV content streamed over the Internet (option 906), or all AV content that might be presented at another device and associated with respective AR content (option 908). Even further, an option 910 may be selected to set or enable the headset to not just present AR contents but to allow personalization of the AR content. For example, the option 910 may be selected to configure the headset to specifically undertake the actions described above in reference to block 708.

Figure 10:
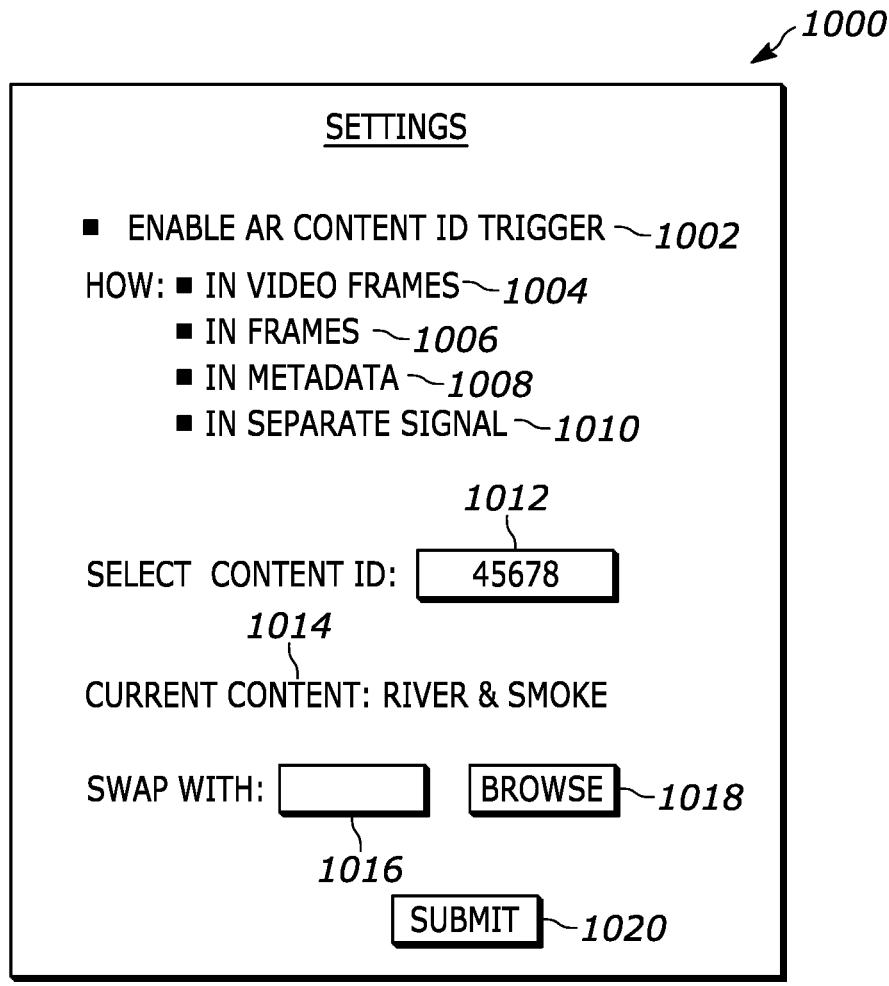

Now describing FIG. 10, it shows an example GUI 1000 that may be presented on a display of a device operated by an AV content provider and/or AR content provider to configure one or more settings related to providing AR content to end-user headsets consistent with present principles. For example, the GUI 1000 may be presented for configuring one or more settings of an Internet server that stores respective AR contents associated with respective portions of AV contents consistent with present principles. Each of the options that will be described below with respect to FIG. 10 may be selected by selecting the corresponding check box shown adjacent to the respective option. The check box may be selected via cursor input, touching the check box, voice command selecting the check box, etc.

As shown in FIG. 10, the GUI 1000 may include a first option 1002 that is selectable to enable or set the server to present AR content ID triggers as part of (or along with) presentation of AV content. For example, selection of the option 1002 may cause insertion of AR content IDs into video, audio, or metadata of AV content as described above, and/or to provide separate signals to a headset indicating AR content IDs. Additionally or alternatively, selection of the option 1002 may configure the server to undertake the logic set forth about with respect to FIG. 8.

Additionally, should the administrator of the server wish to specify how AR content IDs may be provided, he or she may do so by selecting one or more of the options 1004-1010. Specifically, option 1004 may be selected to configure the server to provide AR content IDs via video frames of AV content, option 1006 may be selected to configure the server to provide AR content IDs via audio of AV content, option 1008 may be selected to configure the server to provide AR content IDs via metadata of AV content, and option 1010 may be selected to configure the server to provide AR content IDs via separate signals apart from the AV content itself and its metadata.

Even further, the GUI 1000 may include an input box 1012 at which the administrator may specify an AR content ID for which associated AR content (and its presentation instructions) may be changed or replaced. In the example shown, the administrator has specified that AR content ID 45678 is to have its currently-associated AR content replaced with other AR content. Data 1014 indicates the AR content currently associated with that AR content ID, which is the river and smoke of the example described above in reference to FIG. 4. To specify new AR content to associate with the ID 45678, the administrator may provide a file path or other identifying information for the new AR content at input box 1016. If desired, the administrator may first browse to the desired file path location and select the corresponding AR content for presentation in the box 1016 by selecting a browse selector 1018. Then after the appropriate AR content has been indicated in the box 1016, the administrator may select the submit selector 1020 to command the server to perform the swap so that the new AR content will now be associated with the AR content ID 45678 for transmission to a user's headset the next time a request for AR content is received for content ID 45678.

It may now be appreciated that present principles provide for an improved computer-based user interface that expands the functionality and improves ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
at least one computer readable storage medium (CRSM) that is not a transitory signal, the CRSM comprising instructions executable by at least one processor to:
transmit, to a headset, an indication indicating an augmented reality (AR) content identifier associated with first AR content, the first AR content associated with video content, the video content being different from the first AR content;
receive, from the headset, a first request for AR content associated with the video content, the first request indicating the AR content identifier;
responsive to receipt of the first request, transmit the first AR content to the headset;
receive input to change AR content associated with the AR content identifier from the first AR content to second AR content different from the first AR content;
based on receipt of the input, associate the AR content identifier with the second AR content but not the first AR content; and
subsequent to the association and based on receipt of a second request indicating the AR content identifier, transmit the second AR content rather than the first AR content.

2. The first device of claim 1, wherein the first device comprises one or more servers.

3. The first device of claim 1, wherein the instructions are executable to:
present a graphical user interface (GUI) on a display, the GUI being usable to configure one or more settings of the first device, the GUI comprising an option that is selectable to set the first device to transmit, via respective wireless signals separate and different from respective video contents and separate and different from respective audio for the respective video contents, respective indications indicating respective AR content identifiers for respective AR content associated with the respective video contents.

4. The first device of claim 1, wherein the instructions are executable to:
present a graphical user interface (GUI) on a display, the GUI being usable to configure one or more settings of the first device, the GUI comprising an option that is selectable to set the first device to transmit, via respective metadata for respective video contents, respective indications indicating respective AR content identifiers for respective AR content associated with the respective video contents.

5. The first device of claim 1, wherein the instructions are executable to:
responsive to receipt of the first request, transmit the first AR content to the headset along with timing information indicating when, during presentation of the video content on a second device different from the headset and different from the first device, the first AR content should be presented using the headset.

6. The first device of claim 1, wherein the input is received via a graphical user interface (GUI) presented on a display.

7. The first device of claim 6, wherein prior to receipt of the input the GUI indicates the first AR content as currently associated with the AR content identifier.

8. The first device of claim 6, wherein the GUI permits a user to specify a storage location for the second AR content.

9. The first device of claim 8, wherein the GUI permits the user to specify the AR content identifier.

10. The first device of claim 9, wherein the GUI comprises an input box through which the AR content identifier can be specified.

11. The first device of claim 1, wherein the second AR content is transmitted to a second device different from the headset.

12. The first device of claim 1, comprising the at least one processor.

13. A method, comprising:
receiving a first request for augmented reality (AR) content, the first request indicating an AR content identifier associated with first AR content, the first AR content associated with video content, the video content being different from the first AR content;
responsive to receiving the first request, transmitting the first AR content to a first device;
receiving input to change AR content associated with the AR content identifier from the first AR content to second AR content different from the first AR content;
based on receiving the input, associating the AR content identifier with the second AR content; and
subsequent to the associating and based on receiving a second request indicating the AR content identifier, transmitting the second AR content.

14. The method of claim 13, wherein the second AR content is transmitted to a second device different from the first device.

15. The method of claim 13, wherein the method is performed at least in part at one or more servers.

16. The method of claim 13, wherein the input is received via a graphical user interface (GUI) presented on a display, and wherein prior to receipt of the input the GUI indicates the first AR content as currently associated with the AR content identifier.

17. The method of claim 13, wherein the input is received via a graphical user interface (GUI) presented on a display, and wherein the GUI permits a user to specify a storage location of the second AR content.

18. At least one computer readable storage medium (CRSM) that is not a transitory signal, the CRSM comprising instructions executable by at least one processor to:
receive a first request for augmented reality (AR) content, the first request indicating an AR content identifier associated with first AR content, the first AR content associated with video content, the video content being different from the first AR content;
responsive to receipt of the first request, transmit the first AR content to a first device;
receive input to change AR content associated with the AR content identifier from the first AR content to second AR content different from the first AR content;
based on receipt of the input, associate the AR content identifier with the second AR content; and
subsequent to the association and based on receipt of a second request indicating the AR content identifier, transmit the second AR content.

19. The CRSM of claim 18, wherein the second AR content is transmitted to a second device different from the first device.

20. The CRSM of claim 18, wherein the input is received via a graphical user interface (GUI) presented on a display, and wherein the GUI permits a user to indicate a storage location of the second AR content.

* * * * *